UNITED STATES PATENT OFFICE.

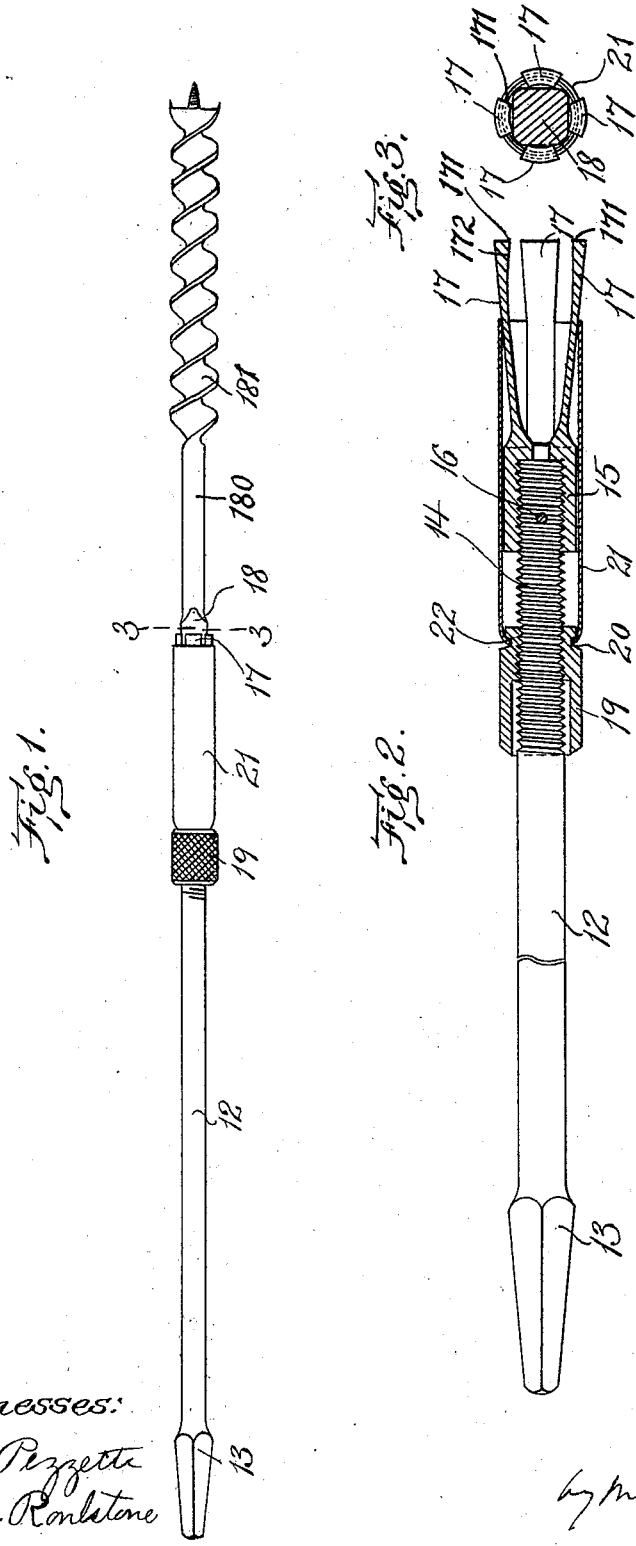

JOHN A. LELAND, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

BIT EXTENSION.

No. 929,231.  Specification of Letters Patent.  Patented July 27, 1909.

Application filed January 4, 1909. Serial No. 470,695.

*To all whom it may concern:*

Be it known that I, JOHN A. LELAND, of Montague, in the county of Franklin and State of Massachusetts, have invented certain new and useful Improvements in Bit Extensions, of which the following is a specification.

This invention has for its object to provide an extension for the shank of an ordinary bit, so that the bit may be adapted to bore unusually deep holes or holes in places which would be inaccessible to a bit of ordinary length, the device embodying my invention being intended particularly for the use of workmen installing electric light wires in the walls of buildings where holes have to be bored to considerable depth and at considerable distances from the surface of a wall.

The invention is embodied in a bit extension comprising an elongated shank having a screw-threaded portion at its outer end and formed at its inner end to engage the chuck or bit holder of an ordinary bit brace, or other suitable operating device; a collar affixed to the outer end of the shank, and provided with four integral diverging spring jaws adapted to grasp the shank of an ordinary bit; a sleeve surrounding the collar and movable endwise thereon, its outer end bearing on the inclined backs of the spring jaws, and a nut engaged with the threaded portion of the shank, and having a loose or rotative engagement with the inner end of the sleeve so that the rotation of the nut moves the sleeve endwise, and causes it to either compress or permit the opening of the spring jaws, the diameter of the jaws, sleeve, and nut being such that they are adapted to enter the hole which may be formed by a bit held by the spring jaws.

Of the accompanying drawings, forming a part of this specification,—Figure 1 represents a side elevation of a bit extension embodying my invention, and a bit to which the extension is applied. Fig. 2 represents a section on line 2—2 of Fig. 1. Fig. 3 represents a section on line 3—3 of Fig. 1.

In the drawings, 12 represents an elongated shank, the main portion of which is preferably of cylindrical form, the shank being provided at its inner end with a squared and tapered portion 13 adapted to be engaged by the jaws of an ordinary bit brace chuck, or other device, adapted to impart rotation to the shank 12. The outer end portion of the shank is provided with a screw-thread 14.

15 represents a collar which is applied to the outer end portion of the shank 12, and rigidly attached thereto in any suitable way. The collar may be internally screw-threaded to engage the external thread of the shank, and after being screwed to place on the shank, may be rigidly secured by solder or by a pin 16 driven into coinciding holes in the collar and shank.

Formed integrally with the collar 15 are a series of four spring jaws 17 which normally divulge by their own resilience, as shown in Fig. 3, so that their outer ends are normally held separate to permit the free insertion or removal of the bit shank.

19 represents a nut, the internal thread of which is formed to engage the thread of the shank 12. Said nut is provided with a peripheral groove 20 at its forward end portion, and is preferably milled or knurled to enable it to be conveniently engaged and manipulated by a thumb and finger.

21 represents a tube or sleeve which is formed to surround the collar 15, and is movable endwise thereon, one end of the sleeve being contracted to form a lip or flange 22 which enters the groove 20, and is loosely engaged therewith so that the nut is adapted to rotate without rotating the sleeve, the described engagement between the nut and sleeve causing the sleeve to move endwise on the shank 12 with the nut. The outer end of the sleeve 21 bears on the inclined backs of the spring jaws 17, the diameter of the sleeve being such that when it is moved forward, it will force the jaws inwardly and cause them to close upon the bit shank 18 and thus tightly grasp the latter. When the sleeve 21 is moved backwardly, the jaws 17 spring outwardly by their own resilience and release the bit shank.

It will be seen that the collar 15, the spring jaws formed thereon, the sleeve 21, and the grooved nut 19, constitute a bit-engaging chuck which is adapted to be made of such small diameter that it may enter the hole formed by a bit engaged with the chuck, the construction being such that the said chuck possesses all the strength and rigidity that is required to hold the extension shank 12 in alinement with the bit shank 18.

It is to be understood that, in practice, the depth of the socket inside the spring jaws 17 is slightly greater than the length of the tapered end 18 of an ordinary bit 180. Such tapered end 18 is, in practice, the same as to form and dimensions as the tapered portion 13 of the shank 12. By comparing the length of the portion 13 in Fig. 2 with the depth of the space or socket inside the jaws 17, it will be understood that a bit shank 180 having a tapered portion 18 corresponding with portion 13, will so fit said space or socket that the tips 171 of the jaws 17 will grip the bit shank slightly beyond the shoulders at the greatest diameter of the tapered portion. And since the jaws 17 are internally concaved in a longitudinal direction, as at 172, the grip will be such that there is no possibility of the boring tool 181 being left at the bottom of a deep hole. If the portion 18 is not inserted to its greatest extent, as in Fig. 1 the tips 171 of the jaws will engage the flat sides of the tapered portion. This will give a fair grip, but a better connection is made by inserting the tapered portion to its full extent, as above described. As the tips 171 are also laterally concaved as shown in Fig. 3, each jaw has two points of contact with a flat side of the tapered shank portion when the latter is not fully inserted, and when fully inserted, the curves between said points of contact of the jaws will fit the round part of the tool shank just beyond the ends of the flat sides of the tapered portion. In either event, whether fully inserted or not, the spaces between the four jaws 17 accommodate the four corners of the tapered portion 18, as clearly shown in Fig. 3, whereby a minimum of space is required, so as to result in providing a coupling readily capable of entering a bored hole without binding therein.

I claim:

A bit extension comprising a shank having at one end a chuck-engaging portion and formed with screw threads at the other end, a collar screwed on the threaded end of the shank and having four integral spring arms laterally concaved at the tips and longitudinally concaved internally behind the tips, a nut fitting an inner portion of the shank threads, and a sleeve having one end engaging the nut and having its other end inclosing the spring arms of the collar.

In testimony whereof I have affixed my signature, in presence of two witnesses.

JOHN A. LELAND.

Witnesses:
  KATHERINE E. NICHOLS,
  EARLE A. BROWN.